United States Patent [19]

Krude

[11] Patent Number: 4,493,676
[45] Date of Patent: Jan. 15, 1985

[54] ROTARY CONSTANT VELOCITY JOINT

[75] Inventor: Werner Krude, Seigburg-Kaldauen, Fed. Rep. of Germany

[73] Assignee: Uni-Cardan Aktiengesellschaft

[21] Appl. No.: 467,212

[22] Filed: Feb. 17, 1983

[30] Foreign Application Priority Data

Feb. 23, 1982 [DE] Fed. Rep. of Germany ....... 3206437

[51] Int. Cl.³ ............................ F16D 3/22; F16D 3/84
[52] U.S. Cl. .................................. 464/141; 464/145; 464/175; 464/906
[58] Field of Search ............... 464/139, 141, 145, 146, 464/906, 173, 175

[56] References Cited

U.S. PATENT DOCUMENTS

| 2,286,498 | 6/1942 | Miller, Jr. | 464/906 X |
| 2,313,279 | 3/1943 | Suczek | 464/141 X |

FOREIGN PATENT DOCUMENTS

| 65331 | 11/1982 | European Pat. Off. | 464/145 |
| 1185868 | 1/1965 | Fed. Rep. of Germany | 464/141 |
| 2816765 | 10/1979 | Fed. Rep. of Germany | 464/145 |
| 53-81859 | 7/1978 | Japan | 464/145 |
| 1527459 | 7/1976 | United Kingdom | |
| 573631 | 9/1977 | U.S.S.R. | 464/141 |

Primary Examiner—Stuart S. Levy
Assistant Examiner—Thomas R. Hannon
Attorney, Agent, or Firm—Toren, McGeady and Stanger

[57] ABSTRACT

A universal joint having an inner joint member and an outer joint member and torque transmitting balls interposed therebetween is formed with recesses which receive the balls in one of the joint members, this one joint member being provided with at least one elastic ring on which the balls are supported.

9 Claims, 7 Drawing Figures

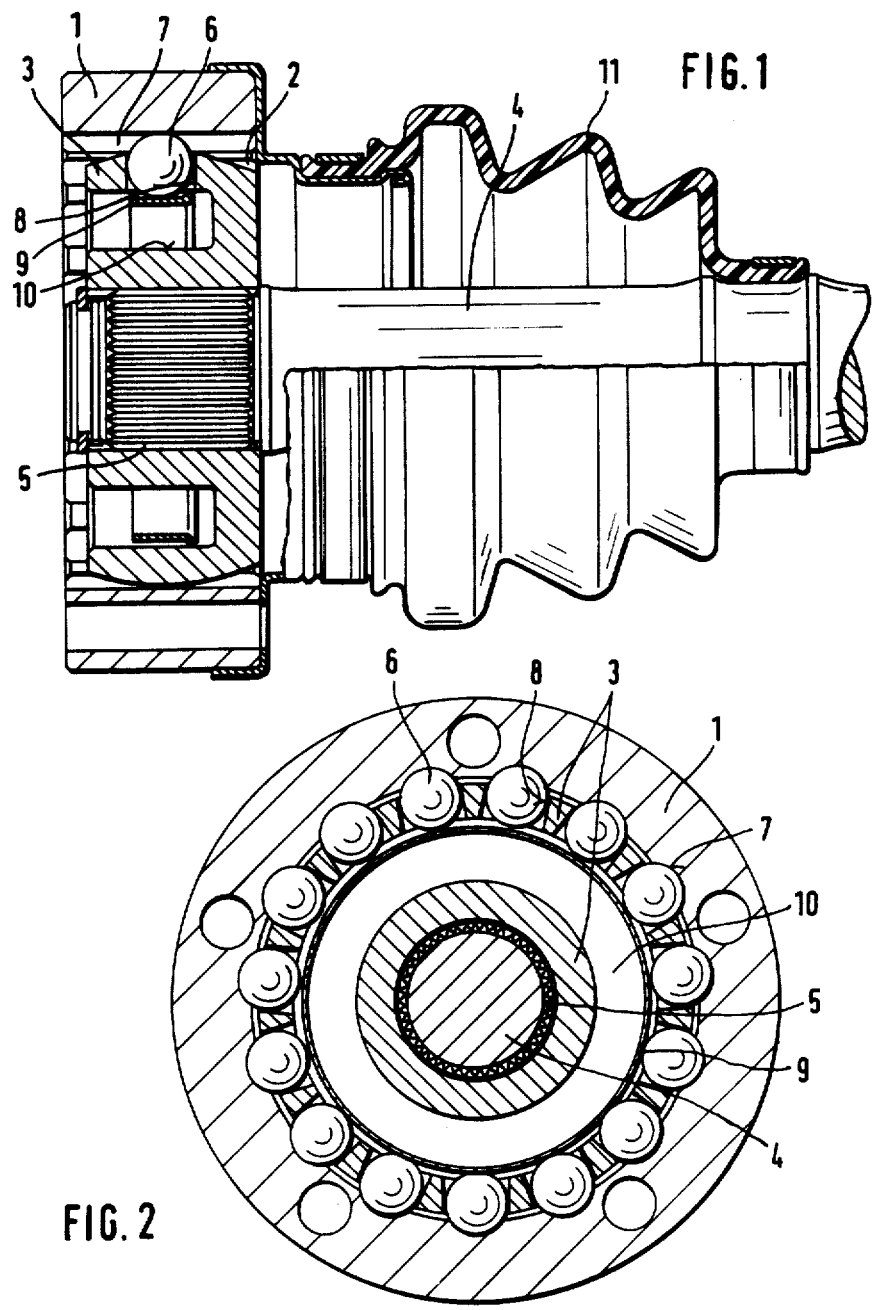

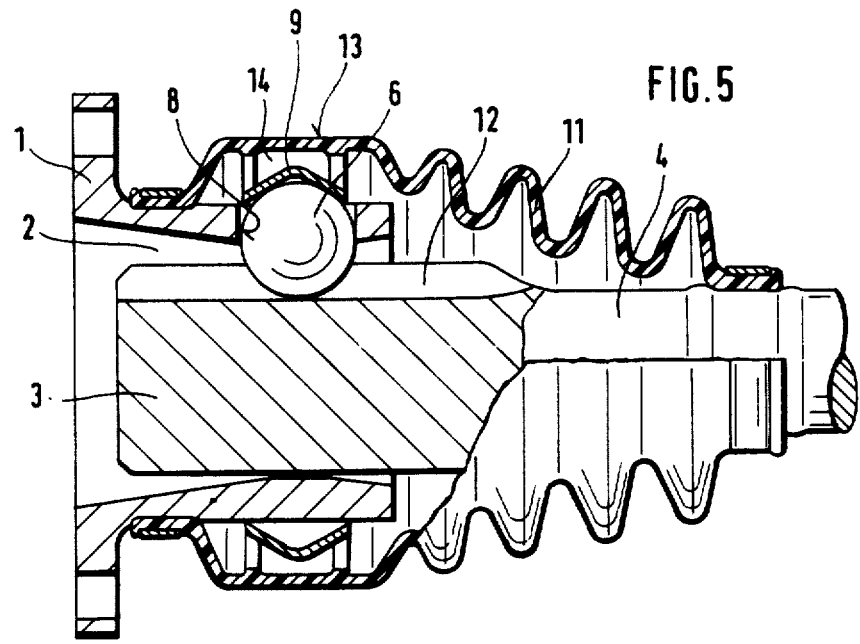
FIG. 5
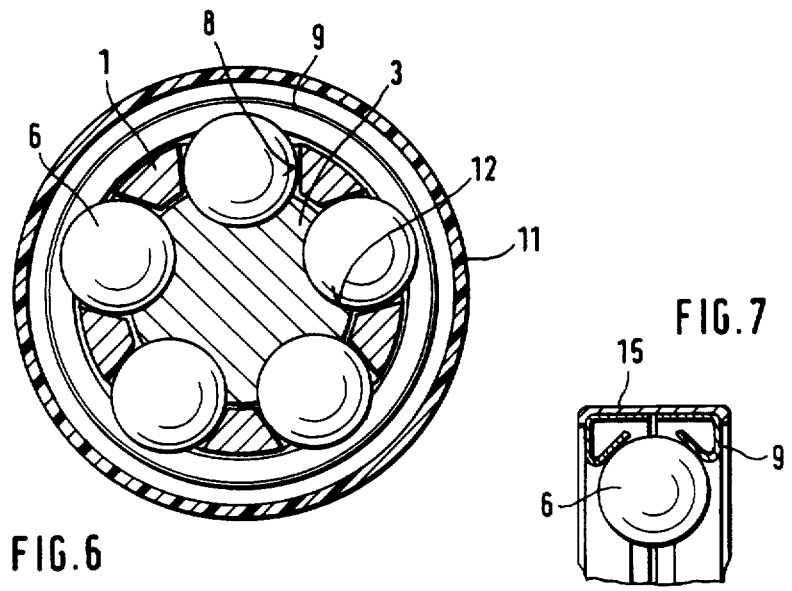
FIG. 6
FIG. 7

ROTARY CONSTANT VELOCITY JOINT

The present invention relates to a rotary constant velocity joint with an outer joint member in whose interior an inner joint member has been arranged, with the inner and outer joint members each having a groove or reces for receiving a torque transmitting ball.

Joints of the type to which the invention relates are known, for example, from British Pat. No. 1,527,459 in the case of which the rolling members are also received in recesses of the inner joint member. However, this principle only permits the production of joints with a small outer diameter. For high torque capacity, designs utilizing this principle where the balls support each other can only be realized with large and therefore, expensive balls. In addition, the Hertzian stress, i.e., the point load between the individual balls would be too high.

It is therefore the object of the present invention to provide a rotary constant velocity joint which, because of the high torque capacity, requires a large outer diameter without there being any disadvantages as regards the functioning of the joint. In addition, it is the intention to provide a joint which has a simple design, is reasonably priced and consists of only a few components.

SUMMARY OF THE INVENTION

Briefly, the present invention may be defined as a rotary constant velocity joint comprising an inner and an outer joint member with torque transmitting balls therebetween, with recesses being formed in one of the joint members receiving the balls and with at least one elastic ring supporting the balls being provided for said one joint member.

The object of the present invention is achieved in that the joint member having the recesses has been provided with at least one elastic ring on which the balls are supported, the advantage of this design being that the balls are able to support themselves on the elastically deformable ring, so that the constant velocity requirements of a joint are complied with. By using this elastic ring the rolling members, when the joint is in an unarticulated condition, are positioned on a circle which is converted into an elipse if the joint is articulated. In this way the kinematic conditions for constant velocity are complied with.

There is a further advantage in that the ring is received freely between the balls, as a result of which the eccentric movement of the ball system can be partly eliminated so that the deformation of the elastic ring caused by the angle of articulation is reduced. In addition, the elastic ring is capable of rotating around its axis of rotation, which enables the balls to roll and which results in satisfactory efficiency.

A further essential feature ensures that in connection with arranging the recesses in the inner joint member, provision will be made for a further hollow space which forms an annular interior, which extends across the circumference, projects into the recesses and in which the elastically deformable ring is arranged.

The advantage of this embodiment is that the elastic ring, in the case of a cylindrical design, is in addition capable of moving axially, so that in the case of a joint displacement the rolling movement of the balls is favored, thereby ensuring small axial forces of displacement. The elastic ring moves approximately around half the distance of displacement in the axial direction.

According to a further essential feature of the invention, the hollow space has been arranged in the inner joint member and extends axially, with the opening being provided at one of the end faces of the inner joint member or extending radially and with the opening simultaneously passing into recesses for receiving the balls, the advantage of this being that the elastic ring is supported by the balls themselves and is capable of moving freely in the hollow space. It is immaterial whether the hollow space extends radially or axially. By providing a hollow space in the radial direction, in the case of which the opening passes into recesses for receiving the balls, it is possible to produce this inner joint member in two parts, so that for producing the actual recesses special operations are not required.

Provision has further been made for the elastic ring to form part of the joint seal if the recess is arranged in the outer joint member.

This is a reversal of the principle of the previously mentioned embodiments.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a longitudinal section of a rotary constant velocity joint having an elastic ring;

FIG. 2 is a a cross-section of the joint illustrated in FIG. 1;

FIG. 5 illustrates a section of a rotary constant velocity joint in the case of which the elastic ring is positioned in the outer joint member;

FIG. 6 shows a cross-section of the joint illustrated in FIG. 5; and

FIG. 7 is a cross-section showing another spring-elastic ring.

DETAILED DESCRIPTION OF THE PREFERRED EMBODIMENTS

Figure 3:
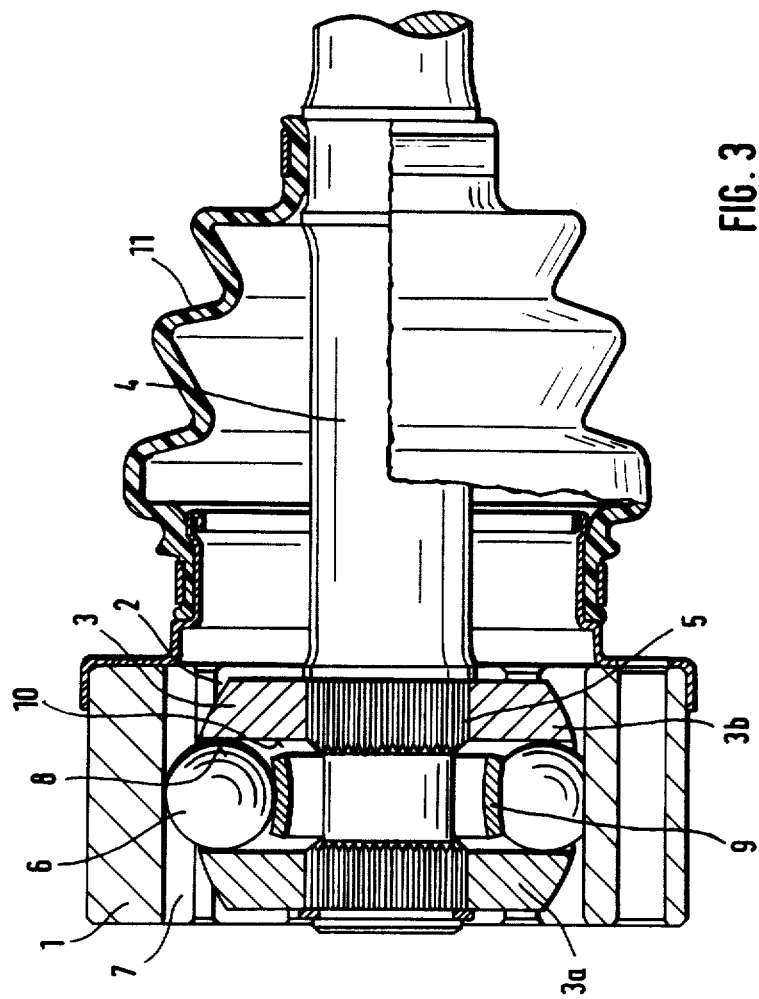
FIG. 3 represents a further embodiment of a joint in the form of a longitudinal section, in principle as illustrated in FIG. 1.

The joint illustrated in FIG. 1 essentially consists of an outer joint member 1 in whose hollow space 2 an inner joint member 3 is received. The inner joint member 3 is nonrotatively connected to a driveshaft 4 by means of longitudinal teeth 5. Balls 6 serve for torque transmitting purposes, the balls 6 being received in grooves 7 of the outer joint member 1 on the one hand and in bores 8 of the inner joint member 3 on the other hand. The bores 8 of the inner joint member 3 have an opening cross-section which corresponds to the diameter of the balls 6.

The balls 6 are held in the bores 8 by an annular resilient member or elastic ring 9 in such a way that they can move radially. The elastic ring 9 is received in a recess 10 which extends axially in the inner joint member 3.

The elastic ring 9 exerts an externally extending force on the balls 6 so that they are permanently held in the grooves 7 of the outer joint member 1. A boot 11 has been provided for sealing the joint interior.

FIG. 2 shows a cross-section of the joint illustrated in FIG. 1 which essentially consists of the outer joint member 1 and the inner joint member 3 in whose bores 8 the balls 6 are received. The driveshaft 4 is connected to the inner joint member 3 by longitudinal teeth 5, and the axially extending recess 10 contains the elastic ring 9 which serves to support the balls 6.

FIG. 3, on the other hand, shows an embodiment where the recess 10 of the inner joint member 3 extends radially so that the bores 8 for receiving the balls 6 run into the recess 10. The elastic ring 9 is placed into the recess 10 before assembly of the balls 6, so that after assembly of the balls the entire unit can be introduced into the outer joint member 1. The inner joint member 3 consists of two parts 3a and 3b, with both parts again being non-rotatively connected to the driveshaft 4 by the longitudinal teeth 5.

Figure 4:
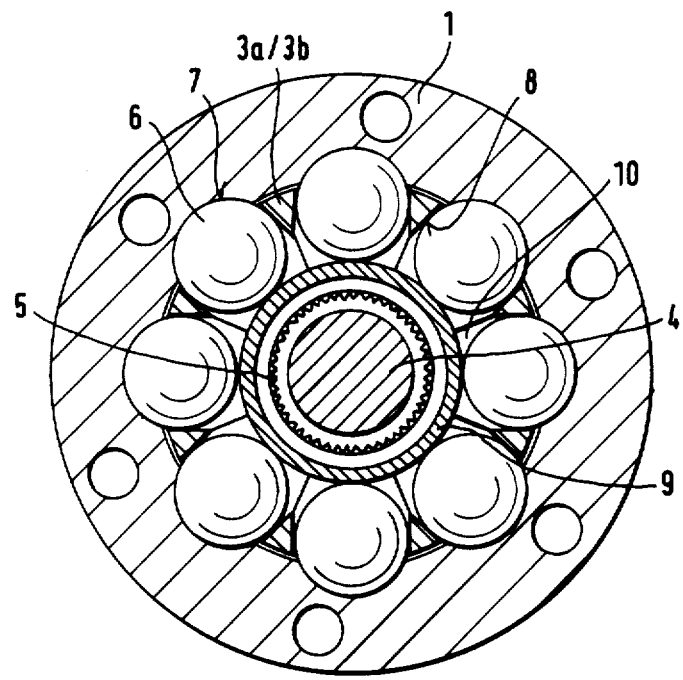
FIG. 4 is a cross-section through the joint shown in FIG. 3.

FIG. 4 shows a cross-section of the joint illustrated in FIG. 3 in the case of which the driveshaft 4 is connected to the inner joint member 3 by the longitudinal teeth 5. In this embodiment, too, the balls 6 are guided in grooves 7 of the outer joint member 1 and in bores 8 of the inner joint member 3 and supported by the ring 9.

In FIG. 5, on the other hand, the elastic ring 9 is arranged on the outside of the outer joint member 1. The inner joint member 3 and the driveshaft 4 are designed as one part and the outer face has been provided with grooves 12 for receiving the balls 6. The outer joint member 1 comprises bores 8 in which the balls 6 are guided. Again, the joint is sealed by a boot 11. In the region of the elastic ring 9 the boot 11 has been provided with a suitable shape 13 so that the elastic ring 9 finds plenty of space in a recess 14.

FIG. 6 shows a cross-section of the joint illustrated in FIG. 5, essentially showing the inner joint member 3 with the grooves 12. The bores 8 are part of the outer joint member 1. The bores 8 of the outer joint member 1 receive the balls 6. The elastic ring has been arranged on the outside of the joint and exercises a radially inwardly directed pressure on the balls 6. The joint as a whole is surrounded by the boot 11.

FIG. 7 illustrates an elastic ring 9 which may be designed either in one part or in two parts. The elastic ring 9 consisting of two parts is surrounded by a supporting ring 15 so that sufficient support is available.

Thus, with the present invention there may be provided a rotary constant velocity joint which, because of its high torque capacity, requires a large outer diameter, without there being any disadvantages as regards the functioning of the joint. Furthermore, the invention operates to provide a joint having a simple design which may be made reasonably priced while consisting of a few components only. The objectives are achieved in that the joint member 1 comprising the bores 8 has at least one elastic ring 9 on which the balls 6 are supported.

While specific embodiments of the invention have been shown and described in detail to illustrate the application of the inventive principles, it will be understood that the invention may be embodied otherwise without departing from such principles.

What is claimed is:

1. A rotary constant velocity universal joint, comprising:
   an outer joint member and an inner joint member arranged on the interior of said outer joint member;
   radially extending recesses formed in one of said inner and outer joint members;
   torque transmitting balls arranged within said radially extending recesses so as to be radially movable therein;
   grooves formed in the other of said joint members adapted to have said torque transmitting balls engaged therein for effecting torque transmission between said inner and outer joint members; and
   an annular resilient member arranged in engagement with said balls and structured to apply thereto a radially directed biasing spring force urging said balls within said recesses into torque transmitting engagement with said grooves.

2. A universal joint according to claim 1, further comprising an annular hollow space within which said annular resilient member is located.

3. A universal joint according to claim 2, wherein said recesses are arranged contiguously with said annular space.

4. A universal joint according to claim 2, wherein said annular space is formed with an axially directed opening on one side thereof.

5. A universal joint according to claim 2, wherein said annular space is axially closed on both sides thereof.

6. A universal joint according to claim 2, wherein said recesses are formed in said inner joint member and wherein said annular space is arranged to extend circumferentially radially inwardly of said recesses immediately adjacent thereto.

7. A rotary constant velocity joint according to claim 1, wherein said recesses are arranged in said outer joint member and wherein said resilient member is arranged to form part of a seal for said joint.

8. A rotary constant velocity joint according to claim 1, wherein said resilient member is arranged radially inwardly of said balls and applies thereto a radially outwardly directed spring biasing force.

9. A rotary constant velocity joint according to claim 1, wherein said resilient member is arranged radially outwardly of said balls and applies thereto a radially inwardly directed spring biasing force.

* * * * *